(12) United States Patent
Ferris et al.

(10) Patent No.: US 8,767,354 B1
(45) Date of Patent: Jul. 1, 2014

(54) DATA STORAGE DEVICE EMPLOYING CASCADED VOLTAGE REGULATORS DURING POWER FAILURE

(75) Inventors: Timothy A. Ferris, Mission Viejo, CA (US); John R. Agness, Laguna Hills, CA (US); Robert P. Ryan, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 31 days.

(21) Appl. No.: 13/314,475

(22) Filed: Dec. 8, 2011

(51) Int. Cl.
*G11B 5/00* (2006.01)
*G11B 33/12* (2006.01)

(52) U.S. Cl.
USPC ............. 360/272; 360/55; 365/227; 365/228

(58) Field of Classification Search
USPC ........... 360/73.01, 75, 272, 55; 365/226, 227, 365/228; 363/10
See application file for complete search history.

(56) References Cited

U.S. PATENT DOCUMENTS

| | | | |
|---|---|---|---|
| 4,375,663 A | | 3/1983 | Arcara et al. |
| 4,516,214 A | | 5/1985 | Ray |
| 5,047,988 A | | 9/1991 | Mizuta |
| 5,414,861 A | | 5/1995 | Horning |
| 5,438,549 A | | 8/1995 | Levy |
| 5,461,518 A | * | 10/1995 | Saiki et al. ........................ 360/69 |
| 5,495,372 A | * | 2/1996 | Bahlmann et al. ............... 360/75 |
| 5,504,402 A | * | 4/1996 | Menegoli ...................... 318/377 |
| 5,596,532 A | | 1/1997 | Cernea et al. |
| 5,693,570 A | | 12/1997 | Cernea et al. |
| 5,768,208 A | * | 6/1998 | Bruwer et al. ................. 365/228 |
| 5,781,473 A | | 7/1998 | Javanifard et al. |
| 5,880,622 A | | 3/1999 | Evertt et al. |
| 5,889,629 A | | 3/1999 | Patton, III |
| 6,115,267 A | | 9/2000 | Herbert |
| 6,189,107 B1 | | 2/2001 | Kim et al. |
| 6,305,628 B1 | * | 10/2001 | Thompson et al. ......... 242/334.3 |
| 6,549,361 B1 | * | 4/2003 | Bennett et al. ................... 360/75 |
| 6,594,102 B1 | * | 7/2003 | Kanda et al. .................... 360/75 |
| 6,856,556 B1 | | 2/2005 | Hajeck |
| 7,038,522 B2 | | 5/2006 | Fauh et al. |
| 7,126,857 B2 | | 10/2006 | Hajeck |
| 7,142,400 B1 | | 11/2006 | Williams et al. |
| 7,161,757 B1 | * | 1/2007 | Krishnamoorthy et al. .... 360/69 |
| 7,269,755 B2 | | 9/2007 | Moshayedi et al. |
| 7,362,601 B2 | | 4/2008 | Uematsu |
| 7,409,590 B2 | | 8/2008 | Moshayedi et al. |
| 7,623,316 B1 | | 11/2009 | Rana et al. |
| 7,688,534 B1 | | 3/2010 | McCornack |
| 7,715,145 B2 | * | 5/2010 | Ooi et al. ........................ 360/75 |
| 7,733,712 B1 | | 6/2010 | Walston et al. |
| 7,800,856 B1 | * | 9/2010 | Bennett et al. ................... 360/75 |

(Continued)

FOREIGN PATENT DOCUMENTS

WO 2010151347 12/2010

*Primary Examiner* — Thomas Alunkal

(57) ABSTRACT

A data storage device is disclosed comprising a non-volatile memory and control circuitry comprising an interface operable to receive a supply voltage, and a capacitor. An operating voltage regulator converts the supply voltage into an operating voltage used to operate the non-volatile memory. The supply voltage is used to charge the capacitor to a capacitor voltage higher than the supply voltage, and during a power failure, a backup voltage regulator converts the capacitor voltage into a backup voltage substantially equal to the supply voltage. The operating voltage regulator converts the backup voltage into the operating voltage used to operate the non-volatile memory.

20 Claims, 4 Drawing Sheets

(56) References Cited

U.S. PATENT DOCUMENTS

| | | |
|---|---|---|
| 7,974,038 B2 * | 7/2011 | Krishnan et al. .............. 360/75 |
| 2002/0141102 A1 * | 10/2002 | Kusumoto .................. 360/75 |
| 2004/0001359 A1 * | 1/2004 | Ott .......................... 365/185.18 |
| 2004/0080858 A1 * | 4/2004 | Suzuki ........................ 360/75 |
| 2005/0024968 A1 * | 2/2005 | Lee et al. .................... 365/218 |
| 2005/0078404 A1 * | 4/2005 | Kuramoto et al. ............ 360/75 |
| 2008/0111423 A1 | 5/2008 | Baker et al. |
| 2009/0140575 A1 | 6/2009 | McGee et al. |
| 2009/0206657 A1 | 8/2009 | Vuk et al. |
| 2009/0206772 A1 | 8/2009 | Bayer et al. |
| 2009/0254772 A1 | 10/2009 | Cagno et al. |
| 2009/0289607 A1 | 11/2009 | Mentelos |
| 2009/0323452 A1 * | 12/2009 | Cagno et al. ................. 365/227 |
| 2010/0066431 A1 | 3/2010 | Carter |
| 2010/0072816 A1 | 3/2010 | Kenkare et al. |
| 2010/0090663 A1 | 4/2010 | Pappas et al. |
| 2010/0146333 A1 | 6/2010 | Yong et al. |
| 2010/0202240 A1 | 8/2010 | Moshayedi et al. |
| 2010/0329065 A1 | 12/2010 | Johnston et al. |
| 2010/0332858 A1 | 12/2010 | Trantham et al. |
| 2011/0066872 A1 | 3/2011 | Miller et al. |
| 2011/0080768 A1 | 4/2011 | Li et al. |
| 2011/0080782 A1 | 4/2011 | Li et al. |
| 2011/0093650 A1 | 4/2011 | Kwon et al. |
| 2011/0198931 A1 * | 8/2011 | Ly ................................ 307/64 |

* cited by examiner

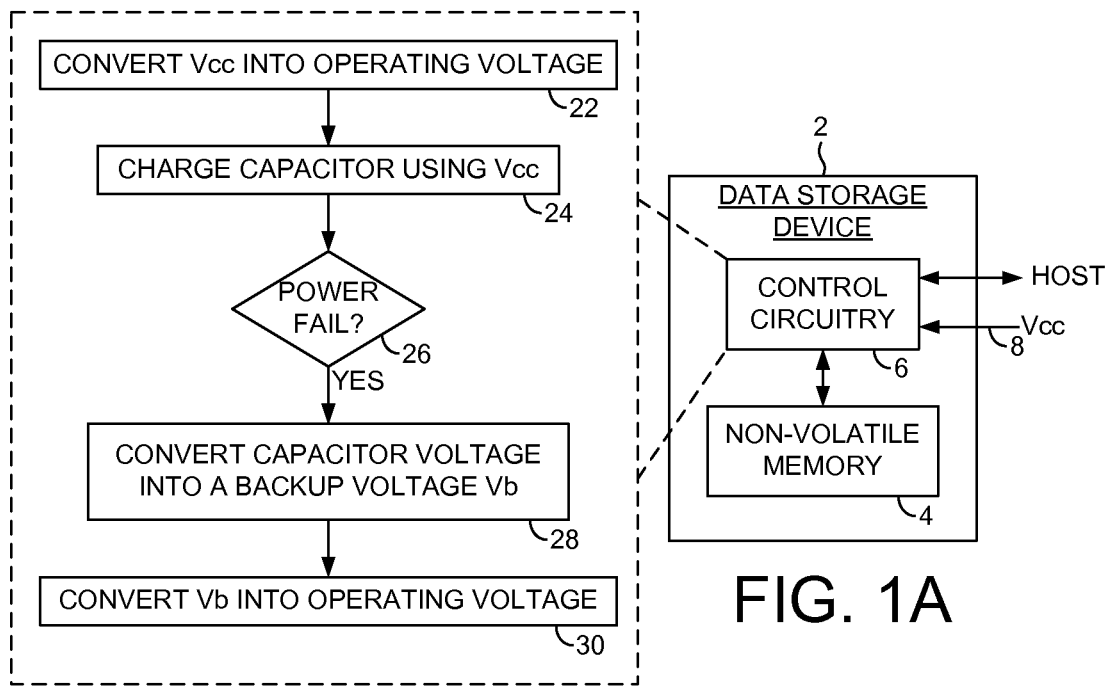
FIG. 1A
FIG. 1C
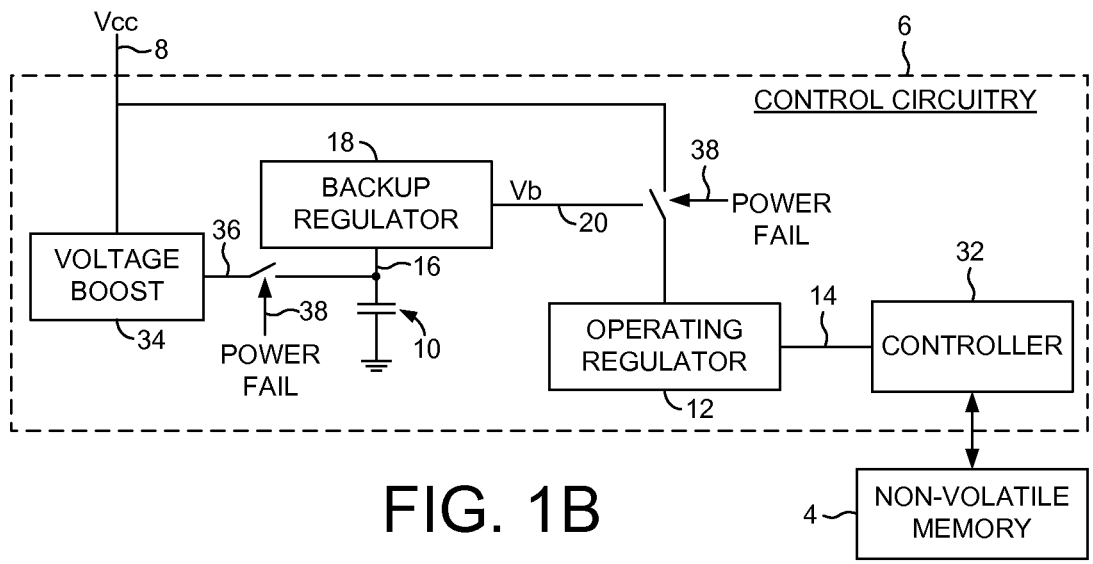
FIG. 1B

DATA STORAGE DEVICE EMPLOYING CASCADED VOLTAGE REGULATORS DURING POWER FAILURE

BACKGROUND

Data storage devices (DSDs), such as disk drives and solid state drives are employed in numerous areas such as computer systems (e.g., desktops, laptops, portables, etc.) and consumer devices (e.g., music players, cell phones, cameras, etc.). User data is typically stored in a non-volatile memory, such as a magnetic disk or a non-volatile semiconductor memory (e.g., Flash memory). When a power failure occurs, it may be desirable to complete pending write commands prior to safely shutting down the DSD so that user data is not lost. This is of particular concern in DSDs that cache write data in a volatile semiconductor memory prior to writing the data to the non-volatile memory. A conventional DSD may charge a capacitor to a high voltage using the power supplied by the host, and then use the capacitor voltage to power circuitry in the DSD to flush a write cache during a power failure. Using a high voltage capacitor to generate the backup power is more cost effective compared to using a lower voltage capacitor or bank of capacitors.

BRIEF DESCRIPTION OF THE DRAWINGS

FIG. 1A shows a data storage device according to an embodiment of the present invention comprising a non-volatile memory.

FIG. 1B shows control circuitry according to an embodiment of the present invention comprising a capacitor, an operating voltage regulator, and a backup voltage regulator.

FIG. 1C is a flow diagram according to an embodiment of the present invention wherein the backup voltage regulator converts the capacitor voltage to a backup voltage for powering the operating voltage regulator during a power failure.

DETAILED DESCRIPTION OF EMBODIMENTS OF THE INVENTION

Figure 2A:
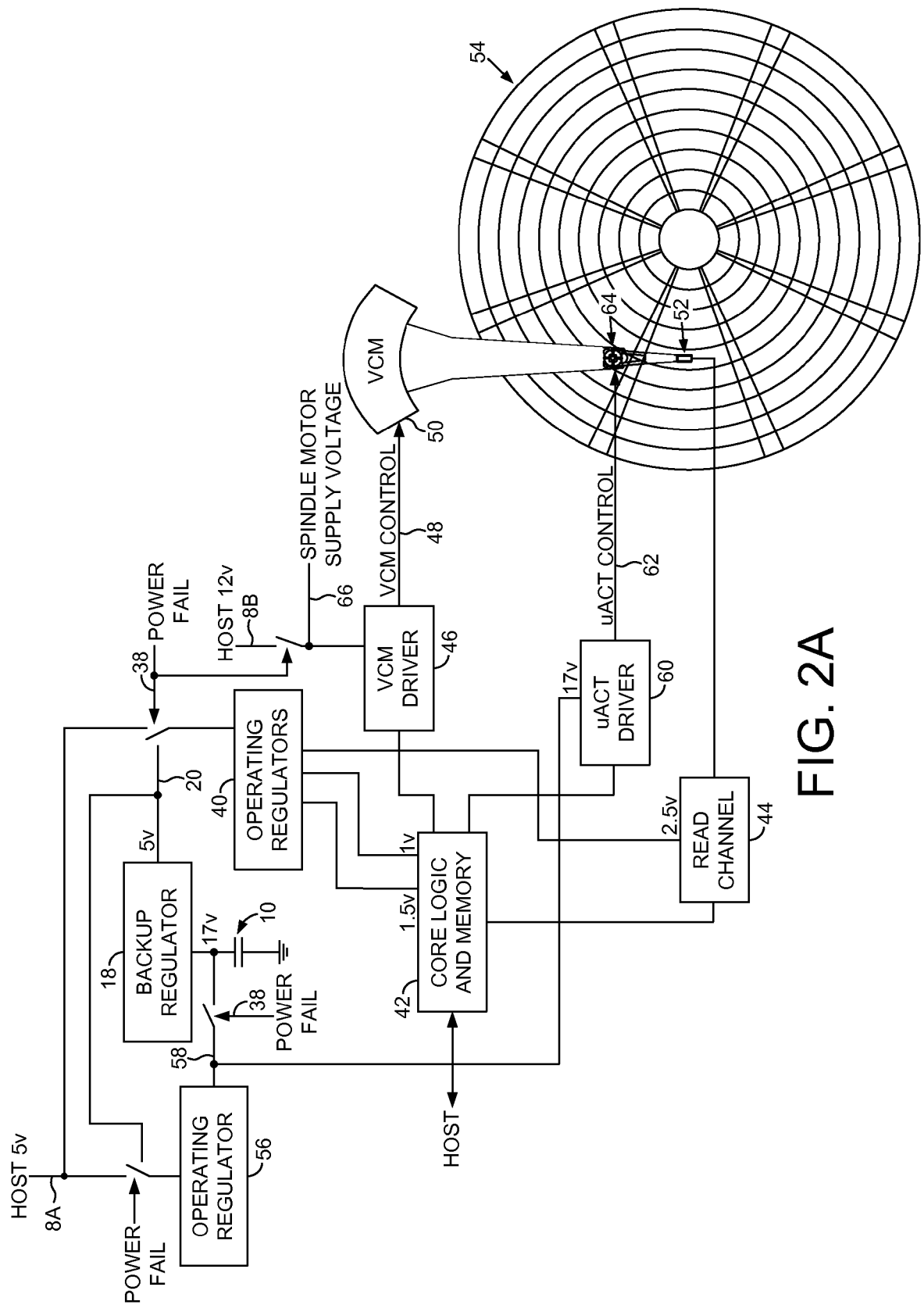
FIG. 2A shows a data storage device comprising a disk drive according to an embodiment of the present invention wherein a 5 v supply is used to charge the capacitor and a 12 v supply powers a voice coil motor (VCM).

FIGS. 1A and 1B show a data storage device 2 according to an embodiment of the present invention comprising a non-volatile memory 4, and control circuitry 6 comprising an interface operable to receive a supply voltage 8, and a capacitor 10. The control circuitry 6 executes the flow diagram of FIG. 1C wherein an operating voltage regulator 12 converts the supply voltage 8 into an operating voltage 14 used to operate the non-volatile memory 4 (step 22). The supply voltage 8 is used to charge the capacitor 10 to a capacitor voltage 16 higher than the supply voltage 8 (step 24), and during a power failure (step 26), a backup voltage regulator 18 converts the capacitor voltage 16 into a backup voltage 20 substantially equal to the supply voltage 8 (step 28). The operating voltage regulator 12 converts the backup voltage 20 into the operating voltage 14 used to operate the non-volatile memory 4 (step 30).

In the embodiment of FIG. 1B, the control circuitry 6 comprises a suitable controller 32 (e.g., a microprocessor and memory) that controls the non-volatile memory 4 in response to the operating voltage 14, for example, by processing host write/read commands. During normal operation, a voltage booster 34 boosts the supply voltage 8 to a boosted voltage 36 that charges the capacitor 10 to a capacitor voltage 16 higher than the supply voltage 8. When a power fail is detected, a power fail control signal 38 disconnects the charging voltage 36 from the capacitor 10, and connects the input of the operating voltage regulator 12 to the backup voltage 20 output by the backup voltage regulator 18.

In the embodiments of the present invention, cascading an operating voltage regulator with a backup voltage regulator decreases the overall expense of the data storage device by enabling the operating voltage regulator to be supplied with the same voltage during a power failure as that supplied during normal operation. This is particularly beneficial when the data storage device comprises multiple operating voltage regulators that can be cascaded with the backup voltage regulator rather than design all of the operating voltage regulators to tolerate a higher supply voltage during a power failure. That is, the backup voltage regulator is designed to convert the higher capacitor voltage to a backup voltage substantially equal to the supply voltage for use by the downstream operating voltage regulators during a power failure. Those skilled in the art will recognize that the several embodiments in the following figures provide example voltage levels in accordance with the general principles set forth above and that other voltage levels may be used.

FIG. 2A shows an embodiment of the present invention wherein the data storage device comprises a disk drive employing multiple operating voltage regulators for generating different operating voltages. For example, operating voltage regulators 40 may generate a 1 v operating voltage and a 1.5 v operating voltage supplied to a core logic and memory block 42, and a 2.5 v operating voltage supplied to a read channel 44. In this embodiment, the disk drive receives a 5 v supply voltage 8A and a 12 v supply voltage 8B from a host. The 12 v supply voltage 8B is applied to a VCM driver 46 that generates a control signal 48 for controlling a VCM 50 that actuates a head 52 radially over a disk 54. The 5 v supply voltage 8A is applied to the operating voltage regulators 40 during normal operation. An operating voltage regulator 56 also boosts the 5 v supply voltage to generate a 17 v boosted voltage 58 for charging the capacitor 10. The 17 v boosted voltage 58 is also applied to a microactuator driver 60 that generates a control signal 62 for controlling a microactuator 64.

When a power fail is detected, the power fail control signal 38 disconnects the VCM driver 46 from the 12 v supply voltage 8B so that the VCM driver 46 is powered by a spindle motor supply voltage 66 generated from a back electromotive force (BEMF) voltage of a spindle motor (not shown) that rotates the disk 54. The backup voltage regulator 18 converts the capacitor voltage across capacitor 10 to a 5 v backup voltage 20, and the power fail control signal 38 connects the operating voltage regulators 40 to the 5 v backup voltage 20. The power fail control signal 38 also connects the operating voltage regulator 56 to the 5 v backup voltage 20 so as to continue to generate the 17 v boosted voltage for the microactuator driver 60. Accordingly, in this embodiment the backup voltage regulator 18 is designed to tolerate the 17 v boosted voltage 58 whereas the operating voltage regulators 40 and 56 are designed to tolerate the lower 5 v supply voltage 8A.

Figure 2B:
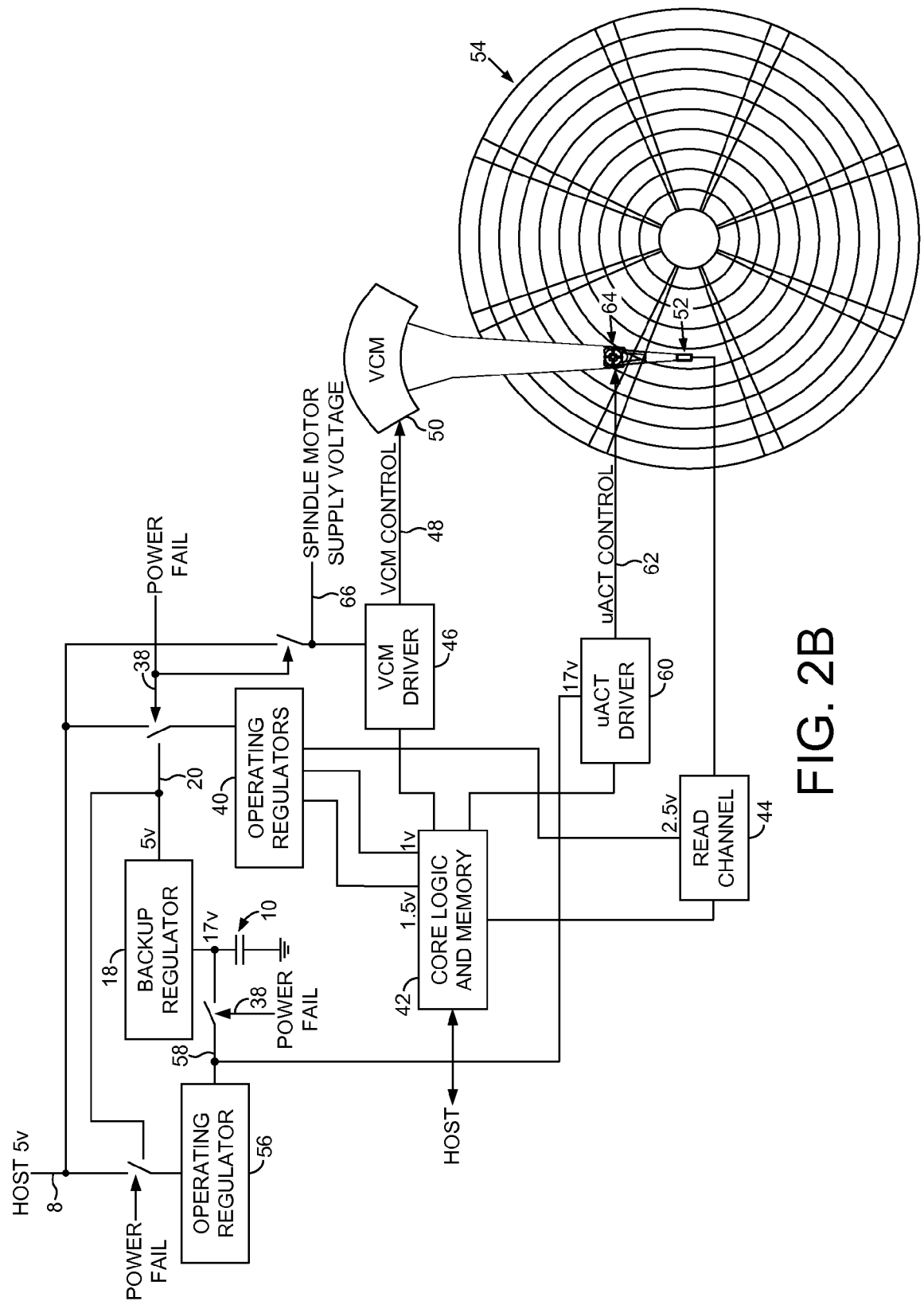
FIG. 2B shows a data storage device comprising a disk drive according to an embodiment of the present invention wherein a 5 v supply is used to charge the capacitor as well as power a voice coil motor (VCM).

FIG. 2B shows an alternative embodiment of the present invention wherein the disk drive receives a single 5 v supply voltage 8 from the host applied to the operating voltage regulators 40 and 56, as well as to the VCM driver 46 during normal operation. A disk drive operating from a single 5 v supply voltage 8 typically employs a smaller form factor disk, such as a 2.5 inch disk drive as compared to a 3.5 inch disk drive that typically requires a 5 v supply voltage and a 12 v supply voltage as shown in FIG. 2A.

Figure 3:
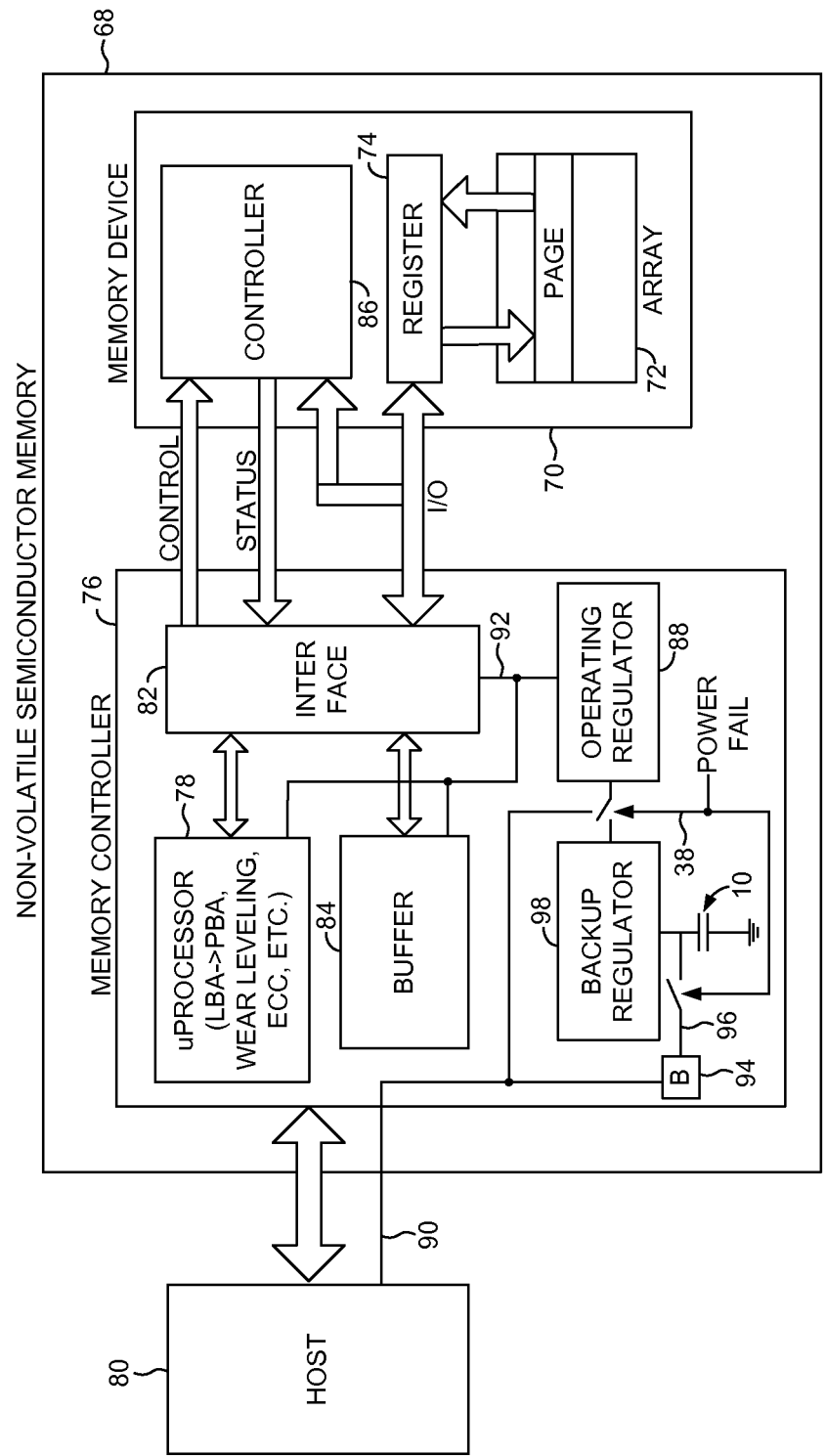
FIG. 3 shows a data storage device comprising a non-volatile semiconductor memory according to an embodiment of the present invention.

FIG. 3 shows a non-volatile semiconductor memory 68 comprising a memory device 70 having a memory array 72 including a plurality of memory segments, and a data register 74 for storing write data prior to being written to one of the memory segments. A memory controller 76 comprises a microprocessor 78 for executing access commands received from a host 80. Interface circuitry 82 generates control signals that enable the microprocessor 78 to communicate with the memory device 70. The non-volatile semiconductor memory 68 may comprise any suitable configuration of memory controller 76 and memory device 70. In one embodiment, the memory device 70 comprises a suitable flash memory (e.g., NAND or NOR flash), and the memory controller 76 comprises a suitable flash controller. In one embodiment, the memory controller 76 implements a solid state drive (SSD) by emulating a disk drive accessible by a host system using a standard disk drive communication protocol (e.g., the ATA protocol). The host 80 in this embodiment may comprise a separate microprocessor (e.g., in a desktop or laptop computer) which communicates with the SSD over a suitable interface (e.g., serial or parallel ATA). In an alternative embodiment, the non-volatile semiconductor memory 68 may be implemented within a consumer device (e.g., a camera or cell phone), wherein the host 80 may be implemented as a firmware component executed by the same microprocessor 78 for implementing the memory controller 76.

In one embodiment, the memory controller 76 comprises a volatile memory (e.g., DRAM) implementing a buffer 84 for caching data that is written to the memory device 70 and read from the memory device 70. The interface circuitry 82 comprises suitable state machine circuitry for accessing the buffer 84 during write/read operations. The memory device 70 comprises a controller 86 for receiving the control signals and command data from the interface circuitry 82. For example, the command data may comprise address information for writing data to a particular memory segment in the memory array 72. The write data is buffered in the data register 74 and when the controller 86 receives a flush command, the controller 86 transfers the data buffered in the data register 74 to the target memory segment in the memory array 72.

The memory controller 76 comprises one or more operating voltage regulators 88 for converting a supply voltage 90 into one or more operating voltages 92 for controlling the components of the non-volatile semiconductor memory 68 during normal operation. The supply voltage 90 is boosted 94 to generate a boosted voltage 96 for charging a capacitor 10. During a power failure, a backup voltage regulator 98 converts the capacitor voltage into a backup voltage substantially equal to the supply voltage 90, and a power fail control signal 38 connects the operating voltage regulator 88 to the backup voltage (as well as disconnects the boosting voltage regulator 94 from the capacitor 10). In this manner, the backup voltage enables the interface circuitry 82 to command the memory device 70 to flush the data stored in the data register 74 prior to shutting down.

Any suitable control circuitry may be employed to implement the flow diagrams in the embodiments of the present invention, such as any suitable integrated circuit or circuits. In one embodiment, the control circuitry may comprise a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on a disk or in a non-volatile semiconductor memory and read into a volatile semiconductor memory when the data storage device is powered on. In yet another embodiment, the control circuitry comprises suitable logic circuitry, such as state machine circuitry. In one embodiment, the operating voltage regulator(s) and the backup voltage regulator may be implemented within a power large scale integrated (PLSI) circuit coupled to an SOC, or integrated within an SOC.

What is claimed is:

1. A data storage device comprising:
a non-volatile memory; and
control circuitry comprising an interface operable to receive a supply voltage, and
a capacitor, wherein the control circuitry is operable to:
use an operating voltage regulator to convert the supply voltage into an operating voltage used to operate the non-volatile memory;
use the supply voltage to charge the capacitor to a capacitor voltage higher than the supply voltage; and
during a power failure:
use a backup voltage regulator to convert the capacitor voltage into a backup voltage substantially equal to the supply voltage; and
use the operating voltage regulator to convert the backup voltage into the operating voltage used to operate the non-volatile memory.

2. The data storage device as recited in claim 1, wherein the control circuitry is operable to:
boost the supply voltage to a boosted voltage higher than the supply voltage; and
charge the capacitor with the boosted voltage.

3. The data storage device as recited in claim 2, further comprising a microactuator operable to actuate a head radially over a disk, wherein the control circuitry is operable to control the microactuator using the boosted voltage.

4. The data storage device as recited in claim 1, further comprising a microactuator wherein during the power failure the control circuitry is operable to:
boost the backup voltage to a boosted voltage higher than the backup voltage; and
control the microactuator using the boosted voltage.

5. The data storage device as recited in claim 1, wherein the operating voltage is lower than the backup voltage.

6. The data storage device as recited in claim 1, wherein the operating voltage is higher than the backup voltage.

7. The data storage device as recited in claim 6, further comprising a voice coil motor (VCM) operable to actuate a head radially over a disk, wherein the control circuitry is operable to control the VCM using the operating voltage.

8. The data storage device as recited in claim 1, wherein the interface receives the supply voltage from a host.

9. The data storage device as recited in claim 1, wherein the non-volatile memory comprises a disk.

10. The data storage device as recited in claim 1, wherein the non-volatile memory comprises a semiconductor memory.

11. A method of operating a data storage device comprising a non-volatile memory, an interface operable to receive a supply voltage, and a capacitor, the method comprising:
  using an operating voltage regulator to convert the supply voltage into an operating voltage used to operate the non-volatile memory;
  using the supply voltage to charge the capacitor to a capacitor voltage higher than the supply voltage; and
  during a power failure:
    using a backup voltage regulator to convert the capacitor voltage into a backup voltage substantially equal to the supply voltage; and
    using the operating voltage regulator to convert the backup voltage into the operating voltage used to operate the non-volatile memory.

12. The method as recited in claim 11, further comprising:
  boosting the supply voltage to a boosted voltage higher than the supply voltage; and
  charging the capacitor with the boosted voltage.

13. The method as recited in claim 12, wherein the data storage device further comprises a microactuator operable to actuate a head radially over a disk, the method further comprising controlling the microactuator using the boosted voltage.

14. The method as recited in claim 11, wherein the data storage device further comprises a microactuator and during the power failure the method further comprising:
  boosting the backup voltage to a boosted voltage higher than the backup voltage; and
  controlling the microactuator using the boosted voltage.

15. The method as recited in claim 11, wherein the operating voltage is lower than the backup voltage.

16. The method as recited in claim 11, wherein the operating voltage is higher than the backup voltage.

17. The method as recited in claim 16, wherein the data storage device further comprises a voice coil motor (VCM) operable to actuate a head radially over a disk, the method further comprising controlling the VCM using the operating voltage.

18. The method as recited in claim 11, wherein the interface receives the supply voltage from a host.

19. The method as recited in claim 11, wherein the non-volatile memory comprises a disk.

20. The method as recited in claim 11, wherein the non-volatile memory comprises a semiconductor memory.

* * * * *